United States Patent [19]

Chen

[11] Patent Number: 5,787,555
[45] Date of Patent: Aug. 4, 1998

[54] STRUCTURE OF TUBE CLAMP

[76] Inventor: Dian-Tai Chen, No. 494-6, Wen-Chang Rd., Yung-Shun Tsun, Ta-Tu Hsiang, Taichung County, Taiwan

[21] Appl. No.: 902,210

[22] Filed: Jul. 29, 1997

[51] Int. Cl.$^6$ .................. B65D 63/00; F16L 33/00
[52] U.S. Cl. .................. 24/274 R; 24/20 LS; 24/279; 24/19
[58] Field of Search .................. 24/274 R, 279, 24/280, 282, 284, 19, 20 R, 20 LS, 23 R, 274 WB; 285/367, 406, 410, 411

[56] References Cited

U.S. PATENT DOCUMENTS

| | | | |
|---|---|---|---|
| 4,099,304 | 7/1978 | Luc | 24/274 R |
| 4,103,637 | 8/1978 | Luc | 24/274 R X |
| 4,237,588 | 12/1980 | Rasmussen et al. | 24/274 R |
| 4,257,149 | 3/1981 | Sydendal | 24/274 R |
| 4,473,928 | 10/1984 | Johnson | 24/274 R X |
| 4,528,730 | 7/1985 | Spaulding | 24/274 R |
| 4,686,747 | 8/1987 | Bäkdahl | 24/274 R |
| 4,706,356 | 11/1987 | Verges | 24/274 R |
| 5,315,737 | 5/1994 | Ouimet | 24/274 R |
| 5,560,087 | 10/1996 | Marques | 24/274 R |

Primary Examiner—Randolph A. Reese
Assistant Examiner—Robert J. Sandy
Attorney, Agent, or Firm—Rosenberg, Klein & Bilker

[57] ABSTRACT

A tube clamp including a transversely grooved binding strap having a first end terminating in a head and a second end terminating in a tail, a screw holder having hinged clamping plates and being fastened to an opening of the head of the binding strap by its clamping plates and adapted for joining the head and tail of the binding strap, and a screw mounted in the screw holder and turned to move the tail of the binding strap relative to its head in tightening up the tube clamp, wherein the head of the binding strap has two longitudinal bridging elements longitudinally disposed at two opposite sides of its opening, four rounded convex portions disposed in four corners of the opening at a top side of the binding strap for supporting the tail of the binding strap, four rounded concave portions respectively disposed between two opposite ends of the bridging elements and the rounded convex portions at the top side of the binding strap and adapted for buffering the pressure of the hinged clamping plates of the screw holder, and four projecting stop portions respectively and outwardly disposed at two opposite ends of the bridging elements and respectively stopped at two opposite ends of the screw holder.

3 Claims, 7 Drawing Sheets

5,787,555

1

STRUCTURE OF TUBE CLAMP

BACKGROUND OF THE INVENTION

The present invention relates to a tube clamp for securing a flexible tubular member for example a hose to a rigid tubular member, and more particularly to an improved structure of tube clamp which can be efficiently and smoothly tightened up with less effort.

FIG. 1 shows a tube clamp according to the prior art. This structure of tube clamp comprises a transversely grooved binding strap 2' having a head D' and a tail E' at both ends, a screw holder 1' having a mounting frame C' welded to the head D' of the binding strap 2' and adapted to join the head D' and the tail E', and a screw 5' mounted in the screw holder 1' and turned to move the tail E' relative to the head D' in tightening up the tube clamp. This structure of tube clamp has drawbacks. Because the screw holder 1' is fastened to the binding strap 2' by welding, the manufacturing cost of this structure of tube clamp is high. Further, because the bottom side of the tail E' is closely disposed in contact with the top side of the head D', a high friction resistance is produced against the movement of the tail E' when the tail E' is moved relative to the head D'. FIGS. 2, 2A, 2B, 2C and 2D show another structure of tube clamp according to the prior art. This structure of tube clamp comprises a transversely grooved binding strap 2" having an opening 4" at its head D", a screw holder 1" fastened to the opening 4" of the binding strap 2" by its hinged clamping plates 3", and a screw 5" mounted in the screw holder 1" and turned to move the tail E" relative to the head D" in tightening up the tube clamp. This structure of tube clamp is still not satisfactory in function. One drawback of this structure of tube clamp is that the hinged clamping plates 3" of the screw holder 1" may be forced to disconnect from head D" of the binding strap 2" when the tube clamp is excessively tightened. Another drawback of this structure of tube clamp is that the screw holder 1" tends to be forced to slide along two longitudinal side edges F" of the binding strap 2" when tightening up the tube clamp. Furthermore, because the bottom side of the tail E" is closely disposed in contact with the top side of the head D", a high friction resistance will be produced against the movement of the tail E" when the tail E" is moved relative to the head D".

SUMMARY OF THE INVENTION

The present invention has been accomplished to provide a tube clamp which eliminates the aforesaid drawbacks. According to one aspect of the present invention, the tube clamp comprises a transversely grooved binding strap having a first end terminating in a head and a second end terminating in a tail, a screw holder having hinged clamping plates and being fastened to an opening of the head of the binding strap by its clamping plates and adapted for joining the head and tail of the binding strap, and a screw mounted in the screw holder and turned to move the tail of the binding strap relative to its head in tightening up the tube clamp, wherein the head of the binding strap has two longitudinal bridging elements longitudinally disposed at two opposite sides of its opening, four rounded convex portions disposed adjacent to four corners of the opening at a top side of the binding strap for supporting the tail of the binding strap, and four rounded concave portions respectively disposed between two opposite ends of the bridging elements and the rounded convex portions at the top side of the binding strap and adapted for buffering the pressure of the hinged clamping plates of the screw holder. Because the bottom side of the

2 tail of the binding strap is supported on the rounded convex portions of the head, less friction resistance is produced between the head and the tail when the tail is moved relative to the head. According to another aspect of the present invention, the head of the binding strap has four projecting stop portions respectively and outwardly disposed at two opposite ends of the bridging elements and respectively stopped at two opposite ends of the screw holder. Therefore, the screw holder is stopped by the projecting stop portions of the head of the binding strap from axial movement on the binding strap.

DETAILED DESCRIPTION OF THE PREFERRED EMBODIMENT

Figure 1:
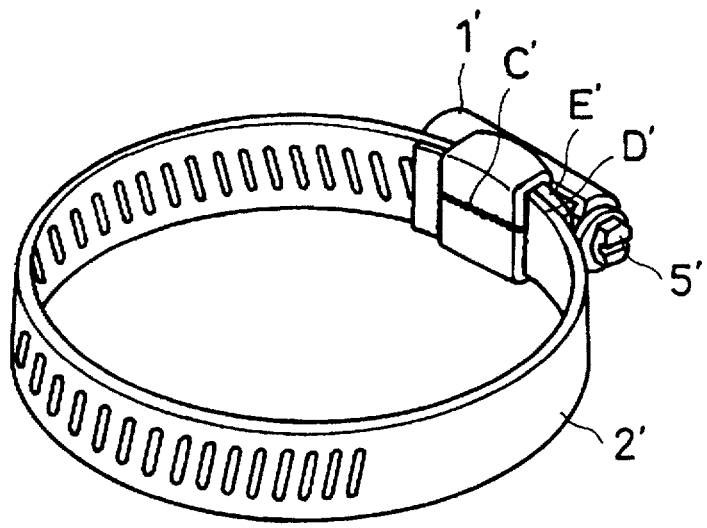
FIG. 1 is an elevational view of a tube clamp according to the prior art.
Figure 2:
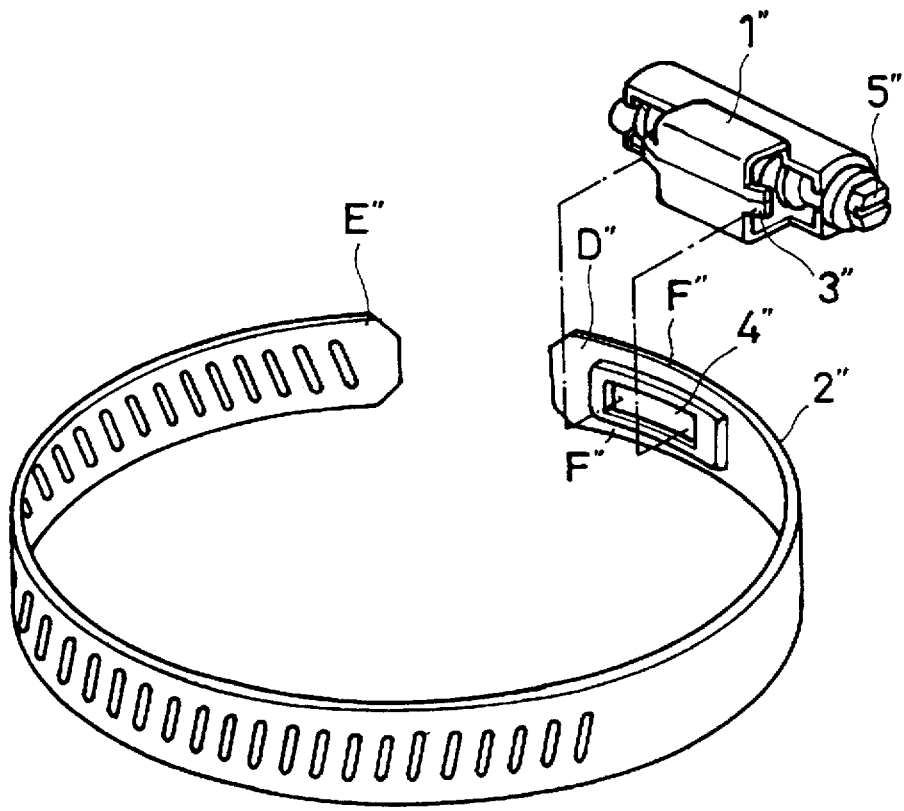
FIG. 2 is an exploded view of another structure of tube clamp according to the prior art.
Figure 2A:
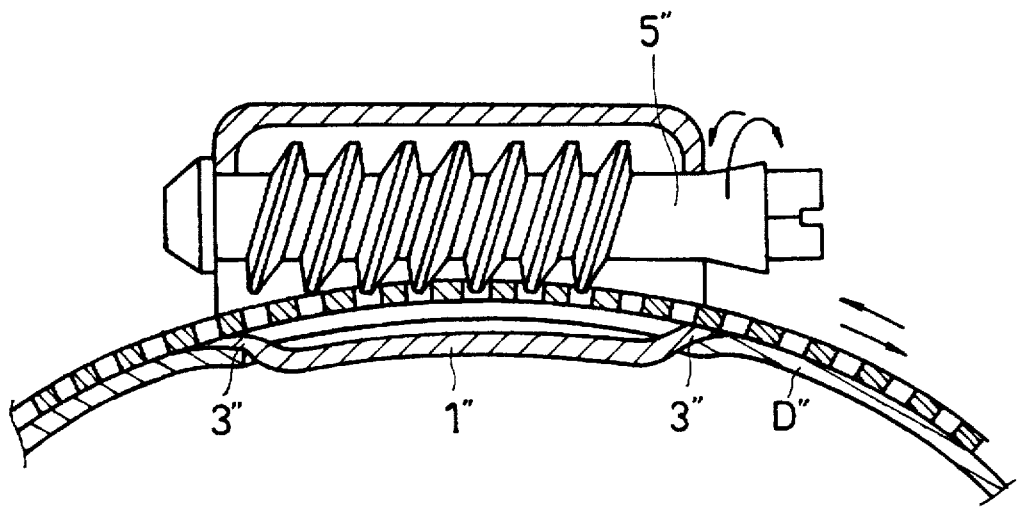
FIG. 2A is a sectional view in an enlarged scale of the tube clamp shown in FIG. 2, showing the screw turned, the tail of the binding strap moved relative to its head.
Figure 2B:
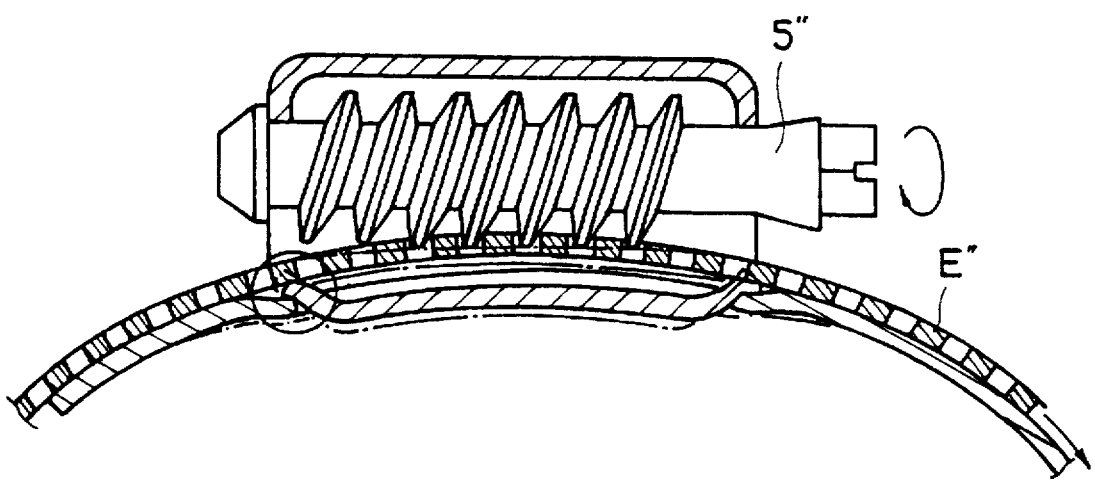
FIG. 2B is similar to FIG. 2A but showing hinged clamping plates forced out of place.
Figure 2C:
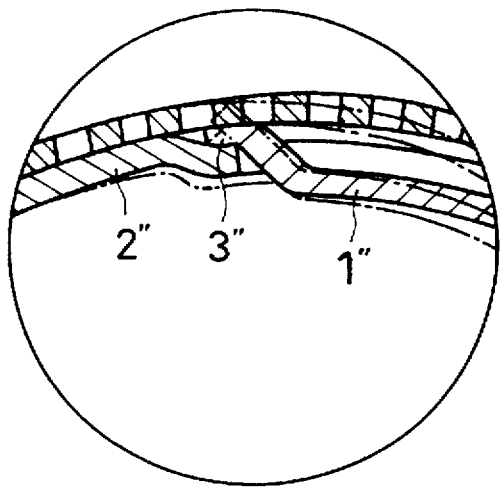
FIG. 2C is an enlarged view of a part of FIG. 2B.
Figure 2D:
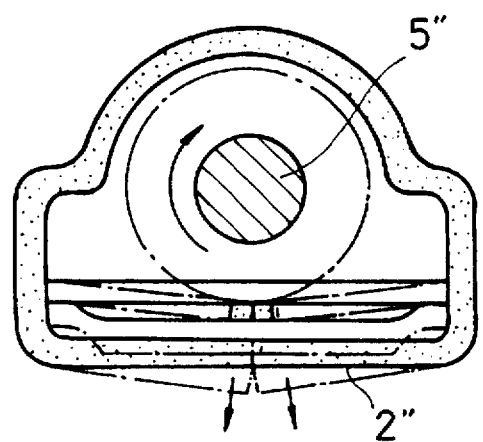
FIG. 2D is a cross sectional view of FIG. 2B.
Figure 3:
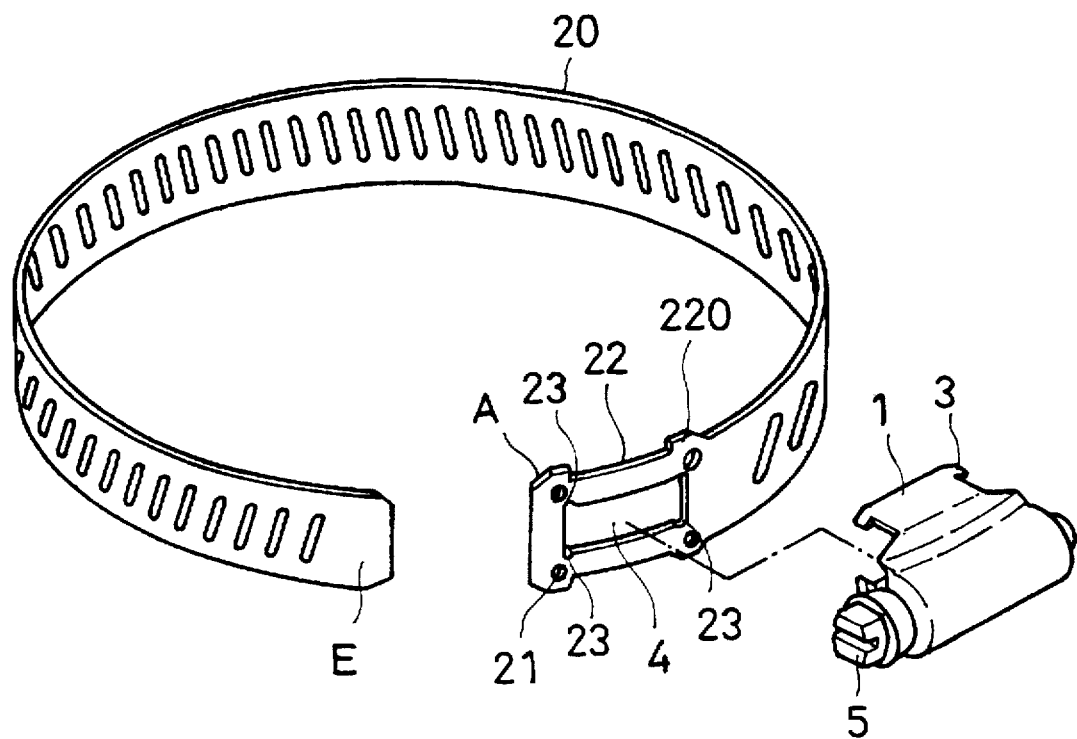
FIG. 3 is an exploded view of a tube clamp according to one embodiment of the present invention.
Figure 4:
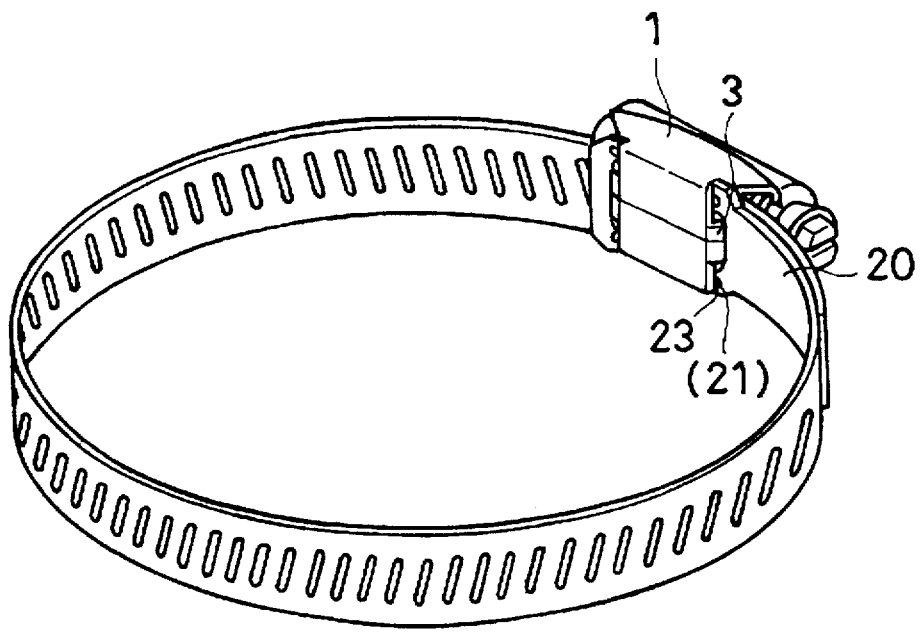
FIG. 4 is an assembly view of the tube clamp shown in FIG. 3.

Referring to FIGS. 3 and 4, a tube clamp in accordance with the present invention is generally comprised of a screw holder 1 having two hinged clamping plates 3, a screw 5, and a transversely grooved binding strap 20. The transversely grooved binding strap 20 has head A at one end defining an opening 4 and fastened to the screw holder 1, and a tail E at an opposite end. The screw holder 1 is fastened to the head A of the transversely grooved binding strap 20 by its hinged clamping plates 3 to join the head A and the tail E.

Figure 5:
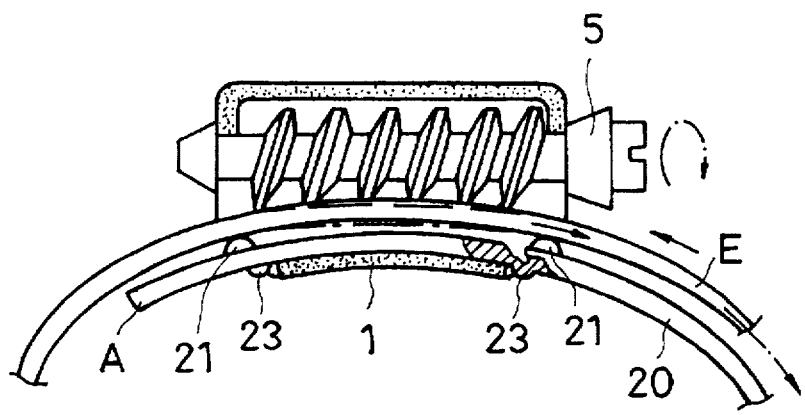
FIG. 5 is a sectional view of a part of tube clamp shown in FIG. 4, showing the screw turned, the tail of the binding strap moved relative to its head.
Figure 6A:
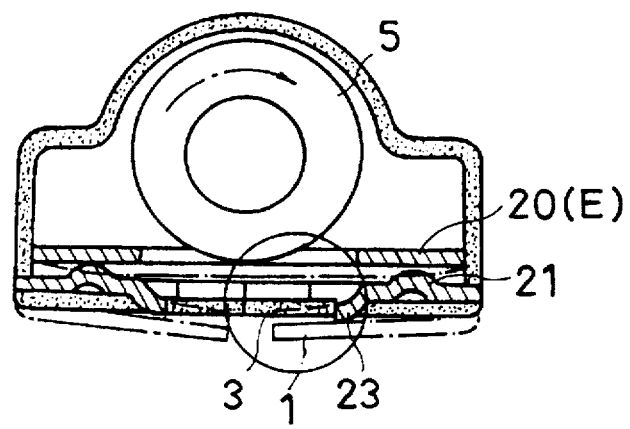
FIG. 6A is a cross sectional view of FIG. 5.
Figure 6B:
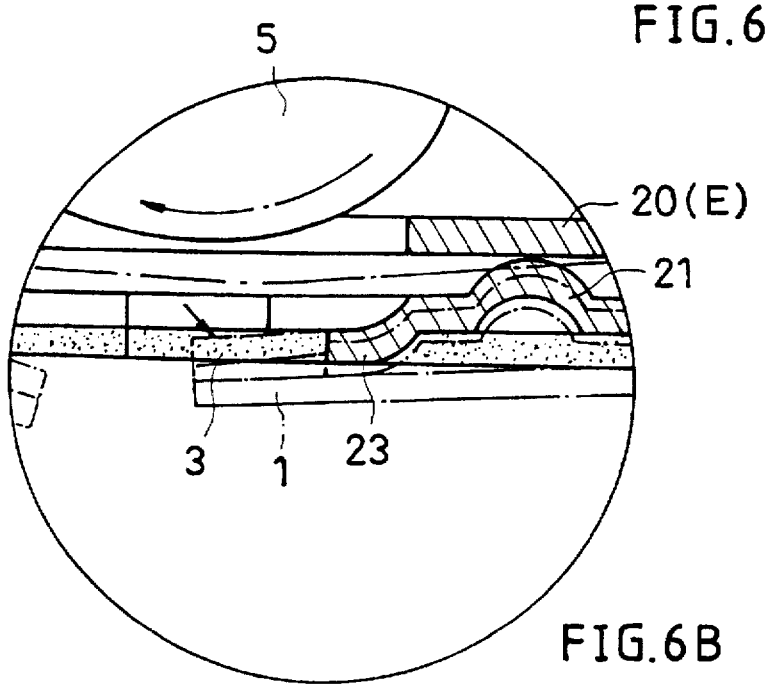
FIG. 6B is an enlarged view of a part of FIG. 6A.
Figure 7A:
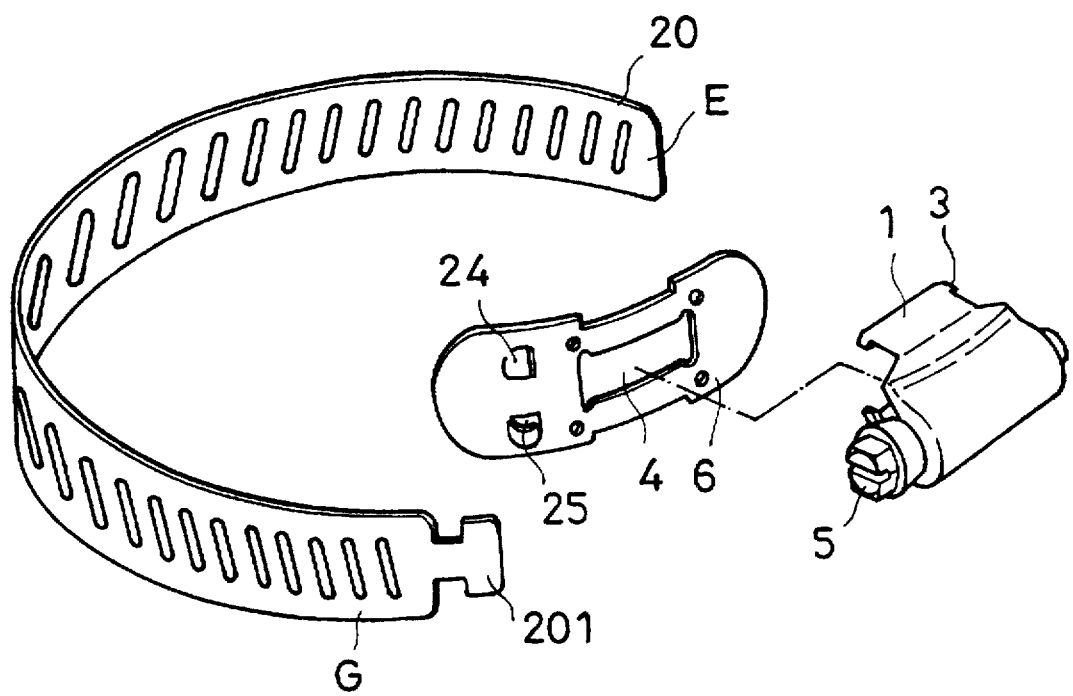
FIG. 7A is an exploded view of a tube clamp according to a second embodiment of the present invention.
Figure 7B:
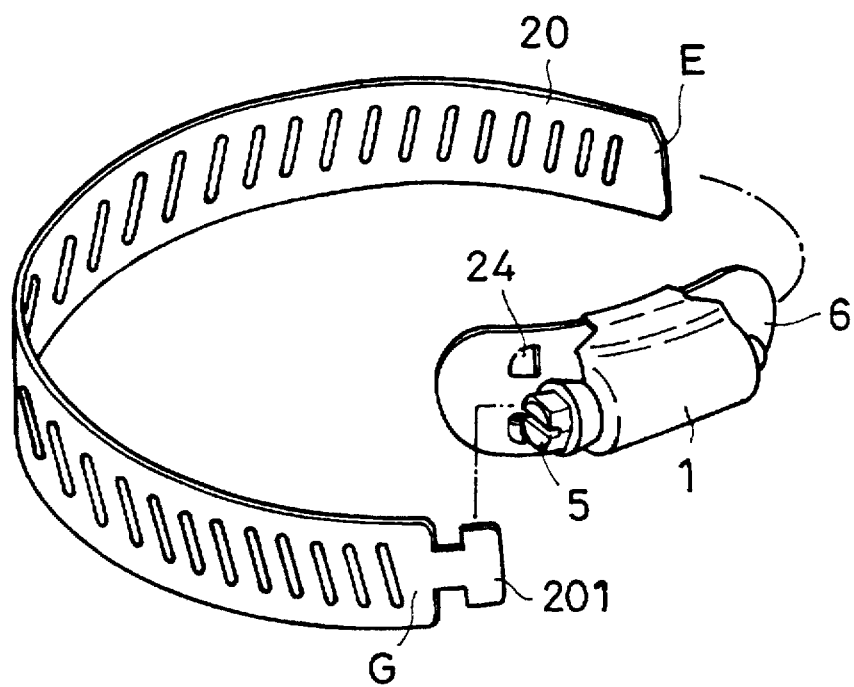
FIG. 7B is similar to FIG. 7A but showing the screw holder fastened to the mounting plate.
Figure 8:
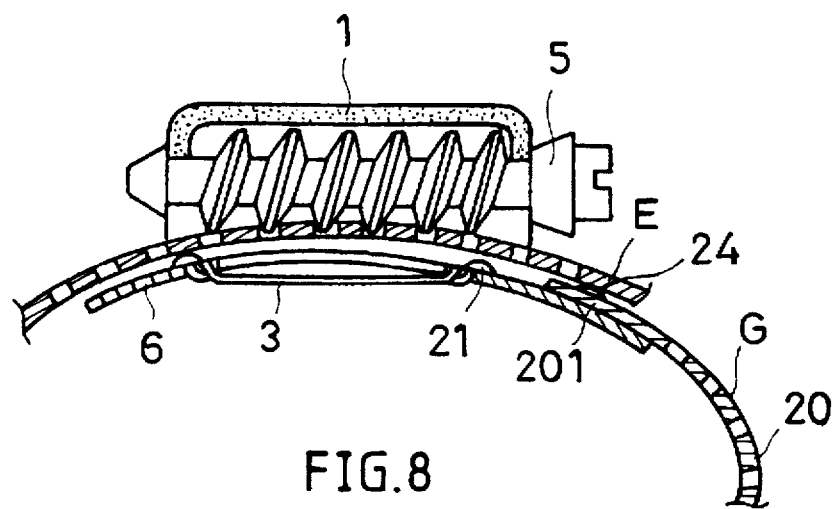
FIG. 8 is a sectional view of a part of the tube clamp of the second embodiment of the present invention, showing the rounded convex portions of the head of the binding strap disposed in contact with the bottom side of the tail of the binding strap.
Figure 9A:
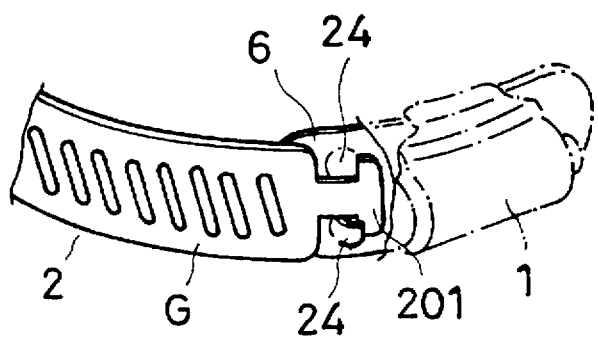
FIGS. 9A and 9B are partial views of the tube clamp of the second embodiment of the present invention, showing the T-shaped hook hooked up with and removed from the retaining strips.
Figure 9B:
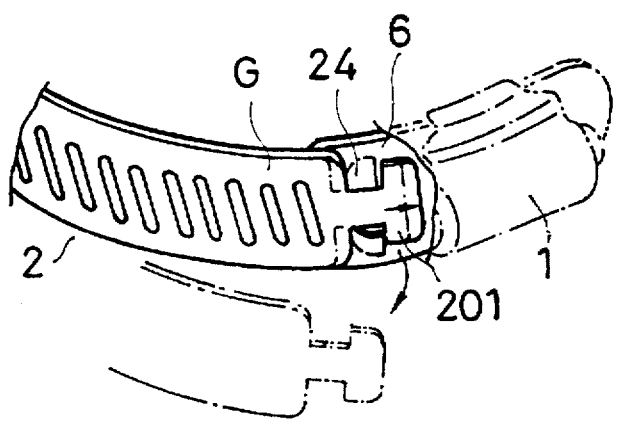

Referring to FIGS. 5, 6A and 6B, and FIGS. 3 and 4 again, when the head A and tail E of the transversely grooved binding strap 20 are joined by the screw holder 1, the screw 5 is turned to move the tail E of the transversely grooved binding strap 20 relative to its head A, thereby causing the transversely grooved binding strap 20 to be tightened up. The head A comprises two longitudinal bridging elements 22 longitudinally disposed at two opposite sides of its opening 4, four rounded convex portions 21 adjacent to four corners of the opening 4, four rounded concave portions 23 respectively disposed between two opposite ends of the bridging elements 22 and the rounded convex portions 21, and four projecting stop portions 220 respectively and outwardly disposed at two opposite ends of the bridging elements 22. When the screw holder 1 is installed, it is stopped between the projecting stop portions 220. Therefore, the screw holder 1 does not slide when the screw 5 is turned to move the tail E relative to the head A. When the tail E is inserted through the screw holder 1, its bottom side is supported on the four convex portions 21, therefore the tail E can be efficiently and smoothly moved relative to the head A by the screw 5. When the transversely grooved binding strap 20 is excessively tightened up, the clamping plates 3 of the screw holder 1 may be forced to deform. If there is a deformation at the clamping plates 3, the rounded concave portions 23 receive and buffer the deformation.

FIGS. 7A, 7B, 8, 9A and 9B show a tube clamp according to an alternate form of the present invention. According to this alternate form, the tube clamp comprises a transversely grooved binding strap 20 having a head G with a T-shaped hook 201 at one end and a tail E at an opposite end, a mounting plate 6 having an opening 4 and two punch holes 25 in front of the opening 4 and two retaining strips 24 respectively raised from the periphery of the punch holes 25, a screw holder 1 with hinged clamping plates 3, and a screw 5 mounted in the screw holder 1. The screw holder 1 is fastened to the opening 4 of the mounting plate 6 by its hinged clamping plates 3. The mounting plate 6 is fastened to the head G of the binding strap E by hooking up the T-shaped hook 201 of the transversely grooved binding strap 20 with the retaining strips 24 of the mounting plate 6. When installed, the tail E is inserted through the screw holder 1, then the screw 5 is turned to move the tail E of the transversely grooved binding strap 20 relative to its head G, and therefore the tube clamp is fastened up.

It is to be understood that the drawings are designed for purposes of illustration only, and are not intended as a definition of the limits and scope of the invention disclosed. Further, like reference signs are designated to indicate like elements or portions of like parts throughout the drawings.

What the invention claimed is:

1. A tube clamp comprising a transversely grooved binding strap having a first end terminating in a head and a second end terminating in a tail, a screw holder having hinged clamping plates and being fastened to an opening of the head of said transversely grooved binding strap by said clamping plates and adapted for joining the head and the tail of said transversely grooved binding strap, and a screw mounted in said screw holder and turned to move the tail of said transversely grooved binding strap relative to said head in tightening up the tube clamp, wherein the head of said transversely grooved binding strap comprises longitudinal bridging elements longitudinally disposed at two opposite sides of said opening, four rounded convex portions disposed adjacent to four corners of said opening and in contact with a bottom side of said tail of said binding strap, and four rounded concave portions respectively disposed between two opposite ends of said bridging elements and said rounded convex portions at a top side of said transversely grooved binding strap for buffering the pressure of said hinged clamping plates of said screw holder.

2. The tube clamp of claim 1, wherein the head of said transversely grooved binding strap further comprises four projecting stop portions respectively and outwardly disposed at two opposite ends of said bridging elements and respectively stopped at two opposite ends of said screw holder.

3. The tube clamp of claim 1, wherein said head comprises a substantially T-shaped hook integrally made on one end of said transversely grooved binding strap, and a mounting plate coupled between said screw holder and said T-shaped hook, said mounting plate comprising two punch holes, and two retaining strips respectively raised from the periphery of said punch holes and adapted for hooking up with said T-shaped hook.

* * * * *